3,330,880
PURIFICATION OF ALKYLATE WITH IRON-CONTAINING MATERIAL AND PRODUCTION OF CHLORINE
Tom Hutson, Jr., and Cecil O. Carter, both of Bartlesville, Okla., assignors to Phillips Petroleum Company, a corporation of Delaware
Filed Aug. 5, 1966, Ser. No. 570,649
9 Claims. (Cl. 260—674)

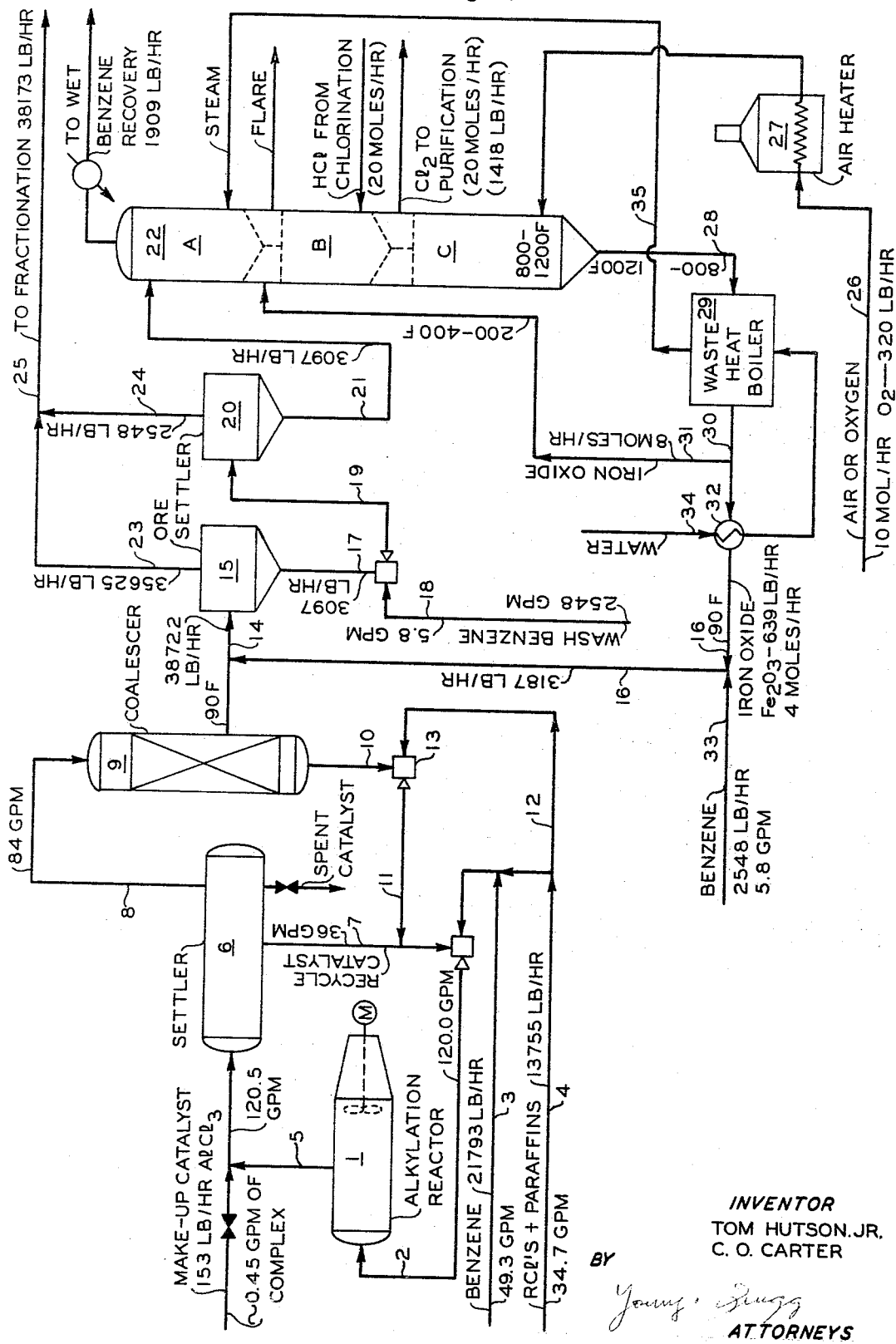

This invention relates to purification of an alkylate. It also relates to the production of chlorine.

In one of its concepts, the invention relates to a method for removing small amounts of catalyst from an alkylate, i.e., an organic product produced by alkylation by contacting the same with an iron-containing material which will react with said catalyst. In another of its concepts, the invention relates to a process for the purification of an organic alkylate to remove aluminum halide, e.g., aluminum chloride, therefrom by contacting the alkylate with an iron-containing material, for example, an iron ore or iron oxide. In a further concept of the invention, it relates to a combination of steps providing for the purification of an alkylate as herein set forth as well as the production of halogen wherewith to produce at least a portion of the alkyl halides which are used in the production of the alkylate. In a still further concept of the invention, it relates to a process for contacting an alkylate produced employing an aluminum chloride catalyst with a suspension or slurry of an iron-containing material with which the aluminum chloride and any hydrogen chloride present in the alkylate will react. In still another of its concepts the invention relates to an operation in which an iron-containing material which has been used to remove aluminum halide and/or hydrogen chloride from an organic alkylate produced employing such a catalyst is treated to produce chlorine and to regenerate the iron-containing material for further use. In still another of its concepts, the invention relates to an operation in which hydrogen chloride resulting from chlorination of hydrocarbons which may be used in the overall operation herein set forth is used to treat said iron-containing material which has been used in contact with said alkylate following which the thus-treated iron-containing material is oxidized to regenerate the same for reuse and to produce chlorine.

The purification of organic alkylate, for example, a hydrocarbon alkylate produced employing an aluminum halide catalyst, for example, aluminum chloride which may be promoted with hydrogen chloride, presents a problem. While the aluminum chloride catalyst, or sludge as it is sometimes called, can be settled and, for the most part, removed from the alkylate, there remains a small amount of aluinum chloride which is quite difficult to remove. This aluminum chloride may be present as a very fine suspension and/or as dissolved aluminum chloride.

We have now conceived that the aluminum chloride and hydrogen chloride remaining in an alkylate after separation of substantially all, but not all, of the catalyst therefrom, can be further considerably and advantageously purified, based upon the following reactions:

$$Fe_2O_3 + 3HCl \rightarrow 2FeCl_3 + 3H_2O$$

$$3H_2O + AlCl_3 \rightarrow Al(OH)_3 + 3HCl$$

Thus, we have found that even when the alkylate is vacuum flashed to remove hydrogen chloride, there will remain some hydrogen chloride in the flash bottoms, and this will be sufficient for the removal of the dissolved aluminum chloride (about 0.82 pound HCl/lb. dissolved $AlCl_3$). Any excess HCl reacts with the iron oxide and will also be removed.

Thus, we have conceived that a slurry of an iron-containing material, for example, iron ore ($Fe_2O_3$, $SiO_2$, etc.), and a diluent such as benzene can be used to contact the effluent from an alkylation reactor. Thus, we have conceived that the dissolved and/or suspended aluminum chloride will be removed by the iron oxide in the ore since it will have been converted as above indicated, and thus will be removed from the alkylate which is contacted with the ore. Thus, the dissolved aluminum chloride or suspended aluminum chloride is precipitated as aluminum hydroxide by the reaction with water released from the reaction of the hydrogen chloride and iron oxide. Still further, we have conceived that the ferric chloride in the ore can then be converted to ferric oxide by the reaction in which air or oxygen is contacted at elevated temperature with the ore with liberation of the chlorine. Thus, the iron oxide is regenerated for recycle to the process for reuse therein. The chlorine which is liberated in this regeneration step can then be purified and recycled to the step in which hydrocarbons may be chlorinated as in the chlorination of paraffins to form alkyl chlorides to be used in the alkylation operation.

The chemical reactions involved in the production of chlorine from hydrogen chloride employing iron oxide are known and described in the literature. Patent 2,577,808 issued Dec. 11, 1951, with reference to Patent 2,206,399 issued July 2, 1940 discusses the reaction. The alkylation of organic compounds employing an aluminum halide catalyst is also known. More specifically, the alkylation of, say, an aromatic with an alkyl chloride employing aluminum chloride as a catalyst is known and discussed in Patent Number 2,992,282, issued July 11, 1961, and in Patent Number 2,072,061, issued Feb. 23, 1937.

It is an object of this invention to provide a process for the alkylation of an organic compound. It is another object of this invention to provide a process for the alkylation of an organic compound employing an alumium halide catalyst. It is a further object of this invention to provide a process for the alkylation of an organic compound and for the purification of the same. A still further object of the invention is to provide a process for the alkylation of an organic compound and its purification in a manner such that the materials used and/or evolved can be reused cyclicly. A still further object of the invention is to provide an operation for the alkylation of an aromatic with an alkyl halide. A still further object of the invention is to provide an operation wherein halogen required to generate the alkyl halide used as alkylating compound is produced in a process in which the alkylate produced is purified.

Other concepts, objects and the several advantages of this invention are apparent from a study of this disclosure, the drawing and the appended claims.

According to the present invention, there is provided a method for purifying an organic alkylate to remove therefrom aluminum chloride and any hydrogen chloride which may be present, which comprises contacting intimately the said alkylate with at least one of a material of the group of iron ore or iron oxide and then recovering the alkylate from the iron-containing material.

Reference will now be made to the drawing in which the invention is illustrated in connection with the alkylation of benzene with alkyl chloride in the presence of an aluminum chloride catalyst. The catalyst is prepared in conventional manner. The preparation of such a catalyst is set forth in Patent 2,297,292, issued Sept. 29, 1942. It will be evident to those skilled in the art having studied this disclosure that the general overall combination of steps now about to be described are subject to some variation and modification, not only with respect to their accomplishment but with respect to the starting and other materials which are employed.

Referring now to the drawing, there is fed to alkylation rector 1 by way of 2 benzene and alkyl chlorides dissolved in paraffins by way of 3 and 4, respectively. From the alkylation reactor, the effluent is removed by 5 and passed to settler 6 from which settled catalyst phase is recycled by 7. The alkylate or hydrocarbon phase is taken over by 8 to coalescer 9 wherein coalescence of catalyst which has been entrained takes place. Catalyst which has been coalesced can be returned by 10 and 11 to 7. As desired, some benzene is passed by 12 to 13 in which the coalesced catalyst is sufficiently slurried so that it can be passed back to 7 by way of 11. From the coalescer the alkylate is passed by 14 to first ore settler 15. While in 14, the alkylate is admixed with iron oxide suspended in benzene fed by 16. Ore is taken by 17 as bottoms from settler 15 and slurried by washed benzene fed by 18 and passed by 19 to ore settler 20. The thus-washed ore is settled and passed by 21 to the top of column 22. The treated alkylate or hydrocarbon phases from ore settlers 15 and 20 are passed by 23 and 24 to 25 and thence to fractionation according to known methods.

Tower 22 is provided with a hydrocarbon stripping section A, a reaction section B, and a regeneration section C. In section A, the ore is steam stripped for removal of benzene and any entrained hydrocarbons therefrom. In section B, the ore together with added iron oxide at a temperature in the approximate range of 200 to 400° F. is reacted with hydrogen chloride resulting from the chlorination of paraffins, for example. The thus-treated ore is passed downwardly into regeneration section C wherein it is treated with air or oxygen which is fed by 26 through heated coil 27 to the bottom of regeneration section C. The temperature in this regeneration section will be in the approximate range of 800–1200° F. From this section the ore is passed by 28 through waste heat boiler 29. A portion is passed by 30 and 31 into reaction section B. Another portion is passed by 30 through preheater 32, thence by way of 16 for reuse in 14. Benzene is added to the operation at 33. Advantageously as a feature of the invention, the heat in the heated ore is recovered in steam which is produced by passing water by way of 34 through preheater 32 and waste heat boiler 29, for recovery as steam at 35.

The following is a specific example of compositions, flow rates, and other information pertinent to the invention:

I. ALKYLATION REACTOR CHARGE

| Comp. | Moles/hr. | Lbs./hr. | G.p.M. |
|---|---|---|---|
| Paraffin | 61 | 10,047 | 26.8 |
| RCl's | 18 | 3,708 | 7.8 |
| Benzene | 279 | 21,793 | 49.3 |
| Recycle Catalyst | | 19,431 | 36.0 |
| | | 54,979 | 120.0 |

II. COALESCER EFFLUENT

| Comp. | Moles/hr. | Lbs./hr. | G.p.M. |
|---|---|---|---|
| HCl | 20 | 729 | |
| Paraffin | 61 | 10,047 | 26.8 |
| Benzene | 261 | 20,387 | 46.1 |
| Alkylate | 18 | 4,370 | 10.1 |
| AlCl$_3$ | | 1.5 | |
| | | 35,534.5 | 83.0 |

III. FIRST STAGE ORE SETTLER BOTTOMS

| Comp. | Moles/hr. | Lbs./hr. |
|---|---|---|
| Fe$_2$O$_3$ | 0.67 | 107 |
| FeCl$_3$ | 6.67 | 1,082 |
| H$_2$O | 0.50 | 9 |
| Benzene | 14.93 | 1,166 |
| Paraffin | 3.09 | 510 |
| Alkylate | 0.92 | 223 |
| | | 3,097 |

IV. FIRST STAGE ORE SETTLER OVERHEAD

| Comp. | Moles/hr. | Lbs./hr. |
|---|---|---|
| Water | 9.5 | 171 |
| Benzene | 278.7 | 21,770 |
| Paraffin | 57.9 | 9,537 |
| Alkylate | 17.1 | 4,147 |
| | 363.2 | 35,625 |

V. SECOND STAGE ORE SETTLER OVERHEAD

| Comp. | Moles/hr. | Lbs./hr. |
|---|---|---|
| Water | 0.28 | 5 |
| Benzene | 27.19 | 2,124 |
| Paraffin | 1.77 | 292 |
| Alkylate | 0.52 | 127 |
| | 29.76 | 2,548 |

VI. SECOND STAGE ORE SETTLER BOTTOMS

| Comp. | Moles/hr. | Lbs./hr. |
|---|---|---|
| Fe$_2$O$_3$ | 0.67 | 107 |
| FeCl$_3$ | 6.67 | 1,083 |
| H$_2$O | 0.22 | 4 |
| Benzene | 20.34 | 1,589 |
| Paraffin | 1.32 | 218 |
| Alkylate | 0.40 | 96 |
| | 29.62 | 3,097 |

The paraffins and alkyl chlorides charged to the alkylation reactor in Step I are generally in the range of $C_9$ to $C_{20}$, and preferably $C_{10}$ to $C_{13}$. Furthermore, when the alkylate produced is used to make detergent materials, it is desirable that the paraffins and alkyl chlorides be normal compounds.

Reasonable variation and modification are possible within the scope of the foregoing disclosure, the drawing and the appended claims to the invention, the essence of which is that a combination operation for purifying an organic alkylate has been conceived and set forth and described in connection with the aluminum chloride catalyzed alkylation of an aromatic with an alkyl chloride wherein the alkylate is purified by contacting the same with an iron-containing material, hydrogen chloride from chlorination to produce the alkyl chlorides is used to treat the used iron-containing material, the thus-treated used iron-containing material is oxidized with production of chlorine which can be reused in the operation, heat used to produce the regeneration effect on the iron-containing material being recovered as steam which can be used in the operation, also as described.

We claim:
1. A method for purifying an organic alkylate to remove therefrom aluminum chloride and hydrogen chloride which comprises contacting intimately said alkylate with at least one of a material of the group of iron ore and iron oxide and then recovering the alkylate from the iron-containing material.
2. A method according to claim 1 wherein the iron-containing material is slurried in a hydrocarbon and the alkylate is contacted with said slurry.
3. A method according to claim 1 wherein the alkylate is a hydrocarbon alkylate, the alkylation reaction effluent is settled to separate substantially all the aluminum chloride phase which is thus formed, therefrom, the alkylate thus obtained is admixed with the iron-containing material, and the alkylate thus treated is recovered.

4. A method according to claim 3 wherein the alkylate is produced by the aluminum chloride catalyzed reaction of an aromatic and a hydrocarbon chloride.

5. A method according to claim 1, wherein the used iron-containing material is treated with hydrogen chloride and then treated under oxidation conditions to produce a chlorine and iron oxide which can be reused.

6. A method according to claim 5 wherein the chlorine is used to produce a hydrocarbon chloride which then is used in an alkylation to produce said alkylate.

7. A method according to claim 1 wherein the alkylate is produced from an aromatic and a hydrocarbon chloride, the alkylation reaction effluent is settled to separate substantially all but not all of the aluminum chloride therefrom, the alkylate thus obtained is passed through a coalescer, then the thus-additionally treated alkylate is admixed with the iron-containing material, and the alkylate thus treated is recovered.

8. A method according to claim 7 wherein the alkylate is admixed with a mixture of the iron-containing material and a diluent suspending medium therefor, the alkylate after treatment is recovered from the admixture thus obtained, the used iron-containing material containing suspension is processed to remove the diluent therefrom, the used iron-containing material is treated at elevated temperature with hydrogen chloride and then under oxidation conditions and chlorine producing conditions to regenerate it to form iron oxide and chlorine.

9. A method according to claim 8 wherein the diluent is an aromatic hydrocarbon such as benzene.

No references cited.

DELBERT E. GANTZ, *Primary Examiner.*

C. R. DAVIS, *Assistant Examiner.*